United States Patent Office 3,637,699
Patented Jan. 25, 1972

3,637,699
DIALKYL-SUBSTITUTED-4-(HYDROXYALKYL-BEARING)AMINOQUINAZOLINES NITRATES
Lloyd P. Gabel, Morris Plains, and William R. J. Simpson, Hanover, N.J., assignors to Sandoz-Wander, Inc., Hanover, N.J.
No Drawing. Continuation-in-part of application Ser. No. 841,990, July 15, 1969. This application Feb. 24, 1970, Ser. No. 13,818
Int. Cl. C07d 51/48
U.S. Cl. 260—256.4 Q       15 Claims

ABSTRACT OF THE DISCLOSURE

Disclosed are compounds of the class of quinazolines substituted in the benzene ring portion of the quinazoline by lower alkyl and further substituted at the 4-position by an amino function bearing a hydroxyalkyl nitrate moiety, e.g., 4-(5-hydroxypentyl)amino-7,8 - dimethylquinazoline nitrate. The compounds have pharmacological activity in animals and are useful, for example, as hypotensive and coronary dilating agents. Also disclosed are the corresponding hydroxy intermediates useful in preparation of the nitrates.

---

This application is a continuation-in-part of our co-pending application Ser. No. 841,990 filed July 15, 1969, now abandoned.

This invention relates to quinazoline derivatives, and more particularly to quinazolines which are substituted in the benzene ring portion thereof by lower alkyl and also substituted at the 4-position by an amino function bearing a hydroxyalkyl nitrate moiety. The invention also relates to pharmaceutical methods and compositions utilizing said compounds. The invention further relates to corresponding hydroxyalkyl substituted quinazolines useful as intermediates in preparation of said nitrates.

The compounds of the invention may be represented by the structural Formula I:

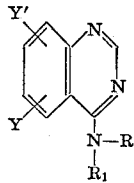

I wherein

R is from the group of (a) $-CH_2(-CH_2)_n-ONO_2$ (b) $-CH_2\left(-\overset{R°}{\underset{|}{CH}}\right)_n-ONO_2$, and (c) $-CH_2(-CH_2)_z-N[-CH_2(-CH_2)_y-ONO_2]_2$ $R_1$ is from the group of (d) $-CH_2(-CH_2)_n-ONO_2$ when R is (a) as above defined, (e) hydrogen, and (f) lower alkyl of 1 to 4 carbon atoms, R° is hydrogen, $-(CH_2-)_mCH_3$ or $-(CH_2-)_yONO_2$ provided that one R° (and only one) is other than hydrogen, that the sum of $n$ and $m$ does not exceed 6 and that the sum of $n$ and $y$ does not exceed 7, or R and $R_1$ together with the 4-amino nitrogen attached to the quinazoline ring form

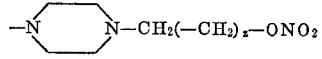

$n$ is 1 to 6, preferably 3 to 5,
$m$ is 0 to 4,
$y$ is 1 to 4,
$z$ is 1 to 4, and each of Y and Y' is lower alkyl of 1 to 3 carbon atoms, e.g. methyl, or a pharmaceutically acceptable non-toxic acid addition salt thereof.

A preferred method for preparation of the compounds of Formula I involves in a Step A reaction the nitration of the corresponding hydroxy compound of Formula II:

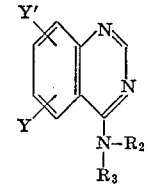

II wherein Y and Y' are as defined and $R_2$ and $R_3$ are the non-nitrate bearing hydroxyalkyl substituents corresponding to R and $R_1$, respectively, i.e.:

$R_2$ is from the group of:

(a) $-CH_2(-CH_2)_n-OH$ (b) $-CH_2(-\overset{R_a°}{\underset{|}{CH}})_n-OH$, and (c) $-CH_2(-CH_2)_z-N[-CH_2(-CH_2)_y-OH]_2$ $R_3$ is from the group of (d) $-CH_2(-CH_2)_n-OH$ when $R_2$ is (a) as above defined, (e) hydrogen, and (f) lower alkyl of 1 to 4 carbon atoms, $R_a°$ is hydrogen, $-(CH_2-)_mCH_3$ or $-(CH_2-)_yOH$ provided that one $R_a°$ is other than hydrogen, that the sum of $n$ and $m$ does not exceed 6 and that the sum of $n$ and $y$ does not exceed 7, or $R_2$ and $R_3$ together with the 4-amino nitrogen attached to the quinazoline ring form

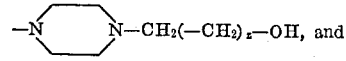

$n$, $m$, $y$ and $z$ are as defined.

The preparation of compounds I by Step A involves a nitration reaction which may be carried out in a manner known per se for nitrating hydroxyalkyl groups. A preferred method of conducting the nitration involves the reaction of a compound II with nitric acid in presence of a carboxylic acid anhydride which is preferably of from 3 to 8 carbon atoms, more preferably acetic acid anhydride. The reaction may be suitably carried out in an organic solvent medium at temperatures in the range of from minus 10° C. to 50° C., preferably 5° C. to 20° C. The solvent medium for the reaction is preferably provided by employing a lower aliphatic carboxylic acid, e.g., acetic acid, although other well known organic solvents may be employed or the reaction may be carried out employing an excess of the carboxylic acid anhydride when said anhydride is a component of the nitrating mixture. The product compound I may be isolated from the reaction mixture of Step A by working up by established procedures.

A preferred method for preparation of compounds II involves a Step B reaction of a 4-haloquinazoline of Formula III:

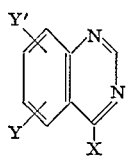
III wherein Y and Y' are as defined and X is chloro or bromo, preferably chloro, with a compound of Formula IV:

IV wherein $R_2$ and $R_3$ are as defined.

The reaction of Step B is of known type and may be carried out in a conventional manner by subjecting the compound III to reaction with the compound IV in an organic solvent at elevated temperatures which may be suitably in the range of 30° C. to 150° C., preferably 50° C. to 100° C. The reaction is carried out in an inert organic solvent which may be any of several of the well-known conventional solvents, preferably an aromatic solvent such as benzene. Another preferred solvent is isopropanol. Alternately, the reaction may be carried out in the inert liquid medium provided by employing an excess of compound IV. An acid binding agent such as sodium carbonate may be also employed to advantage in the reaction, if desired. The reaction product compound II may be isolated from the reaction mixture of Step B by established procedures.

The compounds of Formula IV are either known or may be prepared from known materials by established procedures.

The compounds of Formula III may be prepared by reacting a compound of the Formula V:

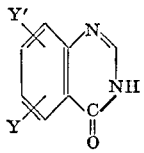
V wherein Y and Y' are as defined, with phosphorus oxychloride or phosphorus oxybromide. Such preparation is carried out in a known matter, for example, at the reflux temperature of the reaction mixture.

The compounds of Formula V in which Y and Y' are other than 7,8-dialkyl, i.e. the compounds of the Formula V-A:

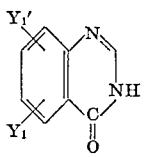
V-A wherein $Y_1$ and $Y_1'$ are lower alkyl as above defined except that they do not signify alkyl groups in the 7- and 8-positions of the nucleus, are preferably prepared by condensing a compound of the Formula VI:

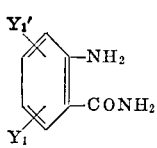
VI in which $Y_1$ and $Y_1'$ are as defined and limited above, with formamide in a conventional manner, for example, at reflux temperatures as illustrated hereinafter in Example 5. The compounds of Formula VI are either known or may be produced from known materials by conventional procedures.

The compounds of Formula V in which Y and Y' represent 7,8-dialkyl, i.e. the compound of Formula V-B:

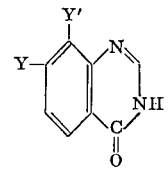
V-B in which Y and Y' are as defined, are preferably produced by condensing a compound of the Formula VII:

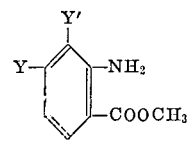
VII wherein Y and Y' are as defined, with formamide in a conventional manner, for example, at reflux temperatures as illustrated hereinafter in Example 1.

The compounds of Formula VII are preferably produced by reducing a compound of the Formula VIII:

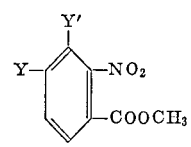
VIII in which Y and Y' are as defined, in a conventional manner, for example, by catalytic hydrogenation as illustrated in Example 1.

The compounds of Formula VIII may be produced surprisingly by nitration of a compound of the Formula IX

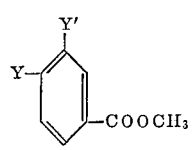
IX wherein Y and Y' are as defined. Such preparation of compounds VIII from compounds IX is desirably effected in an inert organic solvent at temperatures in the range of from 0° C. to 25° C., preferably about 10° C. to 15° C., as illustrated in Step A of Example 1. The compounds of Formula IX employed as starting material in preparation of compounds VIII are either known or may be prepared from known materials by conventional procedures.

Also within the scope of the novel compounds of the invention are pharmaceutically acceptable salts not materially affecting the pharmacological effect of the compounds of Formula I. Such salts include the acid addition salts, e.g., the methane sulfonate, hydronitrate, hydrosulfate, fumarate and maleate. It is convenient to prepare the compounds of Formula I as a hydronitrate addition salt. Such salts may be then readily converted to the free bases by conventional procedures. In preparing the free bases from the acid addition salt it is also convenient to employ a buffer system, e.g., a system comprising a 1:1 molar mixture of acetic acid and sodium acetate, followed by working up by conventional procedures. The free bases may be readily converted into the hydronitrate and other acid addition salts by established procedures.

The compounds of Formula I and their pharmaceutically acceptable acid addition salts are useful because they possess pharmacological activity in animals. In particular, the compounds are useful as hypotensive agents, as indicated by a lowering of blood pressure on intravenous administration to the anesthetized dog. The compounds of the invention are also useful as coronary dilators, as indicated on intraveous administration to the anesthetized dog and measurement of blood flow through the anterior descending branch of the left coronary artery. The compounds are further useful as antianginal agents as indicated by showing a reduction of oxygen consumption and increase in coronary blood flow in the known test involving a determination of myocardial oxygen consumption in the anesthetized dog. The antianginal activity of the compounds may be also exhibited involving the determination of the arithmetic difference between aortic blood pressure and large coronary artery segmental pressure in the anesthetized dog by the method described by W. M. Farm et al., Circulation Research, 22, 649–659, 1968, and/or the comparison of the effect of suitable reference compounds and the compounds of the invention on the tone and autorythmicity of isolated guinea pig taenia coli strips.

For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the abovementioned uses, the dosage administered will, of course, vary depending upon the componuds used, the therapy desired and the mode of administration. However, in general, satisfactory results are obtained when administered at a daily dosage of from about 0.1 milligram to about 50 milligrams per kilogram of body weight, preferably given in divided doses 2 to 4 times a day, or in sustained release form. For most mammals the administration of from 8 milligrams to about 300 milligrams of the compound per day provides satisfactory results and dosage forms suitable for internal administration comprise from about 2 milligrams to about 150 milligrams of the compound in admixture with a solid or liquid pharmaceutical carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
|---|---|
| 4 - (5 - hydroxypentyl)amino - 7,8 - dimethylquinazoline nitrate hydronitrate dimethanesulfonate | 25 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

4-(5-hydroxypentyl)amino-7,8-dimethylquinazoline nitrate hydronitrate

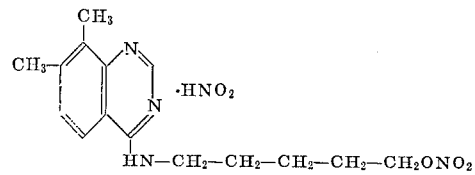

Step A: Preparation of 2-nitro-3,4-dimethyl methyl benzoate.—An amount of 47.2 g. of 3,4-dimethyl methyl benzoate is added over 20 minutes to a cooled well-stirred mixture of 66 ml. of 96% sulfuric acid and 151 ml. of 70% nitric acid. The reaction temperature is regulated at between 10–15° C. with stirring for 2 hours and the reaction mixture is then added slowly to 2 liters of ice water. The resulting precipitated solids are filtered off, dissolved in 500 ml. of methylene chloride and washed with an excess of sodium hydrogen carbonate solution. The organic phase is dried, evaporated to dryness, the crystalline residue is crystallized from methanol-water and recrystallized from methanol to obtain 2-nitro-3,4-dimethyl methyl benzoate, M.P. 110–111° C.

Step B: Preparation of 2-amino-3,4-dimethyl methyl benzoate.—A mixture of 36.7 g. of 2-nitro-3,4-dimethyl methyl benzoate, 60 ml. of acetic acid and 1.0 g. of platinum oxide is shaken with hydrogen at a hydrogen pressure of 10–20 p.s.i. for 1.5 hours. The resulting mixture is filtered and the filtrate treated by addition of ice water. The resulting solid is filtered to obtain 2-amino-3,4-dimethyl methyl benzoate, M.P. 71–73° C.

Step C: Preparation of 7,8 - dimethyl quinazolin-4(3H)-one.—A solution of 26.2 g. of 2-amino-3,4-dimethyl methyl benzoate in 100 ml. of 99% formamide is refluxed for 4.5 hours. The reaction mixture is then cooled, the solid material separated by filtering and washed with water and dried to obtain 7,8-dimethyl-quinazolin-4(3H)-one, M.P. 254–257° C.

Step D: Preparation of 4 - chloro - 7,8 - dimethyl-quinazoline.—A mixture of 20.4 g. of 7,8 - dimethyl-quinazolin-4(3H)-one and 50 ml. of phosphorus oxy-chloride is refluxed for 50 minutes. The reaction mixture is cooled, dissolved in 700 ml. of chloroform and shaken at 0° C. with an excess of dilute ammonia solution. The organic phase is dried and passed through silica gel. The solvent is removed in vacuo to obtain 4-chloro-7,8-dimethyl-quinazoline, M.P. 91–92° C.

Step E: Preparation of 4 - (5 - hydroxypentyl)amino-7,8 - dimethyl - quinazoline.—A mixture of 3 g. of 4-chloro - 7,8 - dimethyl - quinazoline, 2 g. of 5-amino-1-pentanol and 4 g. of sodium carbonate is heated in 50 ml. of refluxing isopropanol for 5 hours. The reaction mixture is then filtered, solvent removed in vacuo and the crystalline residue recrystallized from ethyl acetate to obtain 4 - (5 - hydroxypentyl)amino - 7,8 - dimethyl-quinazoline, M.P. 148–149° C.

Step F: Preparation of 4 - (5 - hydroxypentyl)amino-7,8 - dimethyl - quinazoline nitrate hydronitrate.—A solution of 2.0 g. of 4 - (5 - hydroxypentyl)amino - 7,8-dimethylquinazoline in 8 ml. of glacial acetic acid is added dropwise to a stirred cooled (5–10° C.) mixture of 4.32 ml. of acetic anhydride and 1.42 ml. of 90% nitric acid. Stirring is continued for 15 minutes after addition and then 150 ml. of dry diethyl ether is added. The resulting solid material is separated by filtering, washed with diethyl ether, dried and crystallized from ethanol to obtain 4 - (5 - hydroxypentyl)amino - 7,8 - dimethyl-quinazoline nitrate hydronitrate, M.P. 105–106° C.

EXAMPLE 2

Following the procedures of Example 1 there is obtained:

(a) 4-(6-hydoxyhexyl)amino - 7,8 - dimethylquinazoline, M.P. 144–145° C. (crystallization from ethanol/ethyl acetate).

(b) 4-(6-hydroxyhexyl)amino - 7,8 - dimethylquinazoline nitrate hydronitrate, M.P. 89.5–90° C. (crystallization from abs. ethanol/diethyl ether).

EXAMPLE 3

4-[3-bis(2-hydroxyethyl)aminopropylamino]-7,8-dimethylquinazoline dinitrate dihydronitrate and fumarate

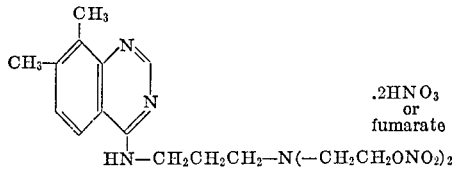

HN—CH₂CH₂CH₂—N(—CH₂CH₂ONO₂)₂

(a) Following the procedure of Step E of Example 1 there is prepared an oil of 4-[3-bis(2-hydroxyethyl)aminopropylamino]-7,8-dimethylquinazoline.

(b) Following the procedure of Step F of Example 1 there is prepared an oil of 4-[3-bis(2-hydroxyethyl)aminopropylamino]-7,8-dimethylquinazoline dinitrate dihydronitrate.

(c) A solution of about 10 g. of 4-[3-bis(2-hydroxyethyl)aminopropylamino] - 7,8 - dimethylquinazoline dinitrate dihydronitrate in water is added to about 100 ml. of a 1:1 molar mixture of acetic acid solution and sodium acetate solution, and the resulting solution is extracted three times each with about 350 ml. of ethyl acetate. The combined ethyl acetate extracts are then washed with about 70 ml. of 10% sodium hydrogen carbonate solution and with about 350 ml. of water, dried with anhydrous magnesium sulfate and concentrated to an oil in vacuo. A solution of this oil in about 30 ml. of ethanol is cooled to 0° C. and treated by addition of about 2.5 g. of fumaric acid. There is then added about 200 ml. of diethyl ether followed by filtration and washing of the recovered solid material with diethyl ether and then drying to obtain 4-[3-bis(hydroxyethyl)aminopropylamino]-7,8-dimethylquinazoline dinitrate fumarate, M.P. 98.5–99° C.

EXAMPLE 4

4-di(4-hydroxybutyl)amino-7,8-dimethylquinazoline dinitrate hydronitrate and hemi-fumarate

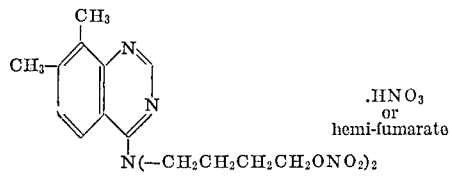

N(—CH₂CH₂CH₂CH₂ONO₂)₂

(a) Following the procedure of Step E of Example 1 there is obtained on crystallization from ethyl acetate the compound 4 - di(4 - hydroxybutyl)amino-7,8-dimethyl-quinazoline, M.P. 93–93.5° C.

(b) Following the procedure of Step F of Example 1 there is prepared an oil of 4-di(4-hydroxybutyl)amino-7,8-dimethylquinazoline dinitrate hydronitrate.

(c) Following substantially the procedure of paragraph (c) of Example 3 there is prepared 4-di(4-hydroxybutyl)amino-7,8-dimethylquinazoline dinitrate hemi-fumarate, M.P. 113–114° C.

EXAMPLE 5

4-(5-hydroxypentyl)amino-6,7-dimethyl-quinazoline nitrate hydronitrate

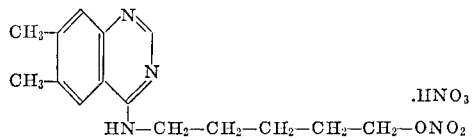

HN—CH₂—CH₂—CH₂—CH₂—CH₂—ONO₂

Step A: Preparation of 4,5 - dimethyl-2-nitrobenzonitrile.—A suspension of 5.1 g. of 4,5-dimethyl-2-nitroaniline in 7.6 ml. of conc. hydrochloric acid and 6 ml. of water cooled to 0° C. is treated dropwise with a solution of 2.24 g. of sodium nitrite in 4 ml. of water while maintaining 0° C.–3° C. The resulting mixture is stirred at minus 5° C. for ½ hour and is then added to a boiling mixture of 12.8 g. of cupric sulfate pentahydrate and 13.2 g. of potassium cyanide in 50 ml. of water. The mixture after nitrogen evolution is cooled and solids filtered off, washed with water and dried. The resulting solids are then dissolved in 75 ml. of chloroform and insoluble material removed by filtering. The solution is evaporated in vacuo to obtain a crystalline material which is crystallized from benzene/heptane to obtain 4,5-dimethyl-2-nitrobenzonitrile, M.P. 162–164° C.

Step B: Preparation of 4,5-dimethyl-2-aminobenzamide.—A mixture of 1.0 g. of 4,5-dimethyl-2-nitrobenzonitrile and 300 mg. of Raney nickel in 15 ml. of methanol is hydrogenated at a hydrogen pressure of 5–10 p.s.i. for ½ hour. The resulting mixture is filtered, evaporated in vacuo and the solid residue dissolved in 50 ml. of hot chloroform and treated with charcoal. The solution is then evaporated in vacuo and the solid residue crystallized from benzene to obtain 4,5-dimethyl-2-aminobenzamide, M.P. 177–175° C.

Step C: Preparation of 6,7 - dimethyl - quinazolin-4(3H)-one.—A mixture of 15 g. of 4,5-dimethyl-2-aminobenzamide and 35 ml. of 99% formamide is refluxed for 35 minutes. The resulting mixture is cooled, diluted with water, filtered and the solid material dried to obtain 6,7-dimethyl-quinazolin-4(3H)-one, M.P. 245–247° C.

Step D: Preparation of 4-chloro-6,7-dimethyl-quinazoline.—A mixture of 14.0 g. of 6,7-dimethyl-quinazolin-4(3H)-one and 40 mls. of phosphorus oxychloride is refluxed for 15 minutes. The cooled resulting mixture is added to 1 liter of ice water and this mixture filtered, washed with cold water and dried in vacuo at 20° C. The resulting residue is dissolved in 300 ml. of chloroform, washed with cold dilute sodium bicarbonate solution, dried and filtered through 400 ml. of silica gel using chloroform as eluant. The solvent is evaporated in vacuo to obtain 4-chloro-6,7-dimethyl-quinazoline, M.P. 131.5–132° C.

Step E: Preparation of 4 - (5 - hydroxypentyl)amino-6,7-dimethyl-quinazoline.—Following the procedure of Step E of Example 1 there is obtained 4-(5-hydroxypentyl)amino-6,7-dimethyl-quinazoline, M.P. 94–95.5° C.

Step F: Preparation of 4 - (5 - hydroxypentyl)amino-6,7-dimethyl-quinazoline nitrate hydronitrate.—Following the procedure of Step F of Example 1 there is obtaind on crystallization from ethanol/diethyl ether the compound 4-(5-hydroxypentyl)amino-6,7-dimethyl - quinazoline nitrate hydronitrate, M.P. 120.5–121.5° C.

EXAMPLE 6

Following the procedure of Steps A, B, C and D of Example 5 and Steps E and F of Example 1 there is obtained:

(a) 4-[3-bis(2 - hydroxyethyl)aminopropylamino] - 6,7-dimethyl-quinazoline, M.P. 127–130° C.
(b) 4-[3-bis(2 - hydroxyethyl)aminopropylamino] - 6,7-dimethyl-quinazoline dinitrate dimaleate, M.P. 102.5–103.5° C. (decomp.) after procedure of Step (c) of Example 3.
(c) 4-di(3-hydroxypropyl)amino-6,7-dimethyl-quinazoline.
(d) 4-di(3-hydroxypropyl)amino-6,7-dimethyl - quinazoline dinitrate hydronitrate, M.P. 116–117° C.

What is claimed is:
1. A compound of the formula:

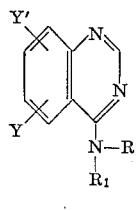

wherein
R is from the group of
(a) $-CH_2(-CH_2)_n-ONO_2$

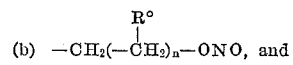

(b) $-CH_2(-CH_2)_n-ONO$, and
(c) $-CH_2(-CH_2)_z-N[-CH_2(CH_2)_y-ONO_2]_2$ $R_1$ is from the group of
(d) $-CH_2(-CH_2)_n-ONO_2$ when R is (a) as above defined,
(e) hydrogen, and
(f) lower alkyl of 1 to 4 carbon atoms, $R°$ is hydrogen, $-(CH_2-)_mCH_3$ or $-(CH_2-)_yONO_2$, provided that one and only one $R°$ is other than hydrogen, that the sum of $n$ and $m$ does not exceed 6 and that the sum of $n$ and $y$ does not exceed 7, or R and $R_1$ together with the 4-amino nitrogen attached to the quinazoline ring form

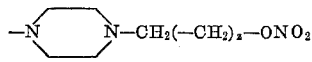

$n$ is 1 to 6
$m$ is 0 to 4
$y$ is 1 to 4
$z$ is 1 to 4, and each of Y and Y' is lower alkyl, or a pharmaceutically acceptable non-toxic acid addition salt thereof.

2. A compound of claim 1 in which $R_1$ is hydrogen.
3. A compound of claim 2 in which R is $$-CH_2(-CH_2)_n-ONO_2$$

4. A compound of claim 3 in which $n$ is in the range of from 3 to 5.
5. A compound of claim 4 in which Y and Y' are 6,7-dimethyl.
6. A compound of claim 4, in which Y and Y' are 7,8-dimethyl.
7. A compound of claim 2 in which R is $$-CH_2(-CH_2)_z-N[-CH_2(-CH)_y-ONO_2]_2$$

8. A compound of claim 7 in which $z$ is 2.
9. A compound of claim 8 in which $y$ is 1.
10. The compound of claim 9 in which Y and Y' are 7,8-dimethyl.
11. The compound of claim 1 in which each of R and $R_1$ is $-CH_2(-CH_2)_n-ONO_2$.
12. A compound of claim 11 in which each $n$ is the same.
13. A compound of claim 12 in which $n$ is in the range of from 3 to 5.
14. A compound of claim 13 in which Y and Y' are 7,8-dimethyl.
15. The compound of claim 14 in which $n$ is 3.

References Cited

UNITED STATES PATENTS 1,724,086   8/1929   Hentrich et al. _____ 260—256.4

ALEX MAZEL, Primary Examiner

R. J. GALLAGHER, Assistant Examiner

U.S. Cl. X.R.

260—251 Q, 251 QA, 256.5 R, 471 R; 424—251

UNITED STATES PATENT OFFICE
CERTIFICATE OF CORRECTION

Patent No. 3,637,699          Dated January 25, 1972

Inventor(s) Lloyd P. Gabel and William R.J. Simpson

It is certified that error appears in the above-identified patent and that said Letters Patent are hereby corrected as shown below:

Column 5 - line 29 delete the word "componuds" and insert the word --compounds--.

Column 6 - line 27 - in the structure delete "$HNO_2$" and insert --$HNO_3$--.

Column 7 - line 19 delte the word "hydoxyhexyl" and insert -- hydroxyhexyl --.

Column 7 - line 34 insert a -- . -- before the word fumarate.

Column 7 - line 69 insert a -- . -- before the word hemi-fumarate.

Column 9 - line 32 in the formula delete "$(CH_2)_y$" and insert -- $(-CH_2)_y$ --.

Column 10 - line 21 in the formula delete "$(-CH)_y$" and insert -- $(CH_2)_y$ --.

Signed and sealed this 5th day of November 1974.

(SEAL)
Attest:

McCOY M. GIBSON JR.          C. MARSHALL DANN
Attesting Officer          Commissioner of Patents